J. A. SCHREIBER.
BREAD MOLDING MACHINE.
APPLICATION FILED APR. 7, 1914.

1,156,185.

Patented Oct. 12, 1915.
4 SHEETS—SHEET 3.

WITNESSES:
H. W. Meade
E. M. Culver

INVENTOR
John A. Schreiber
BY
A. M. Wooster
ATTORNEY

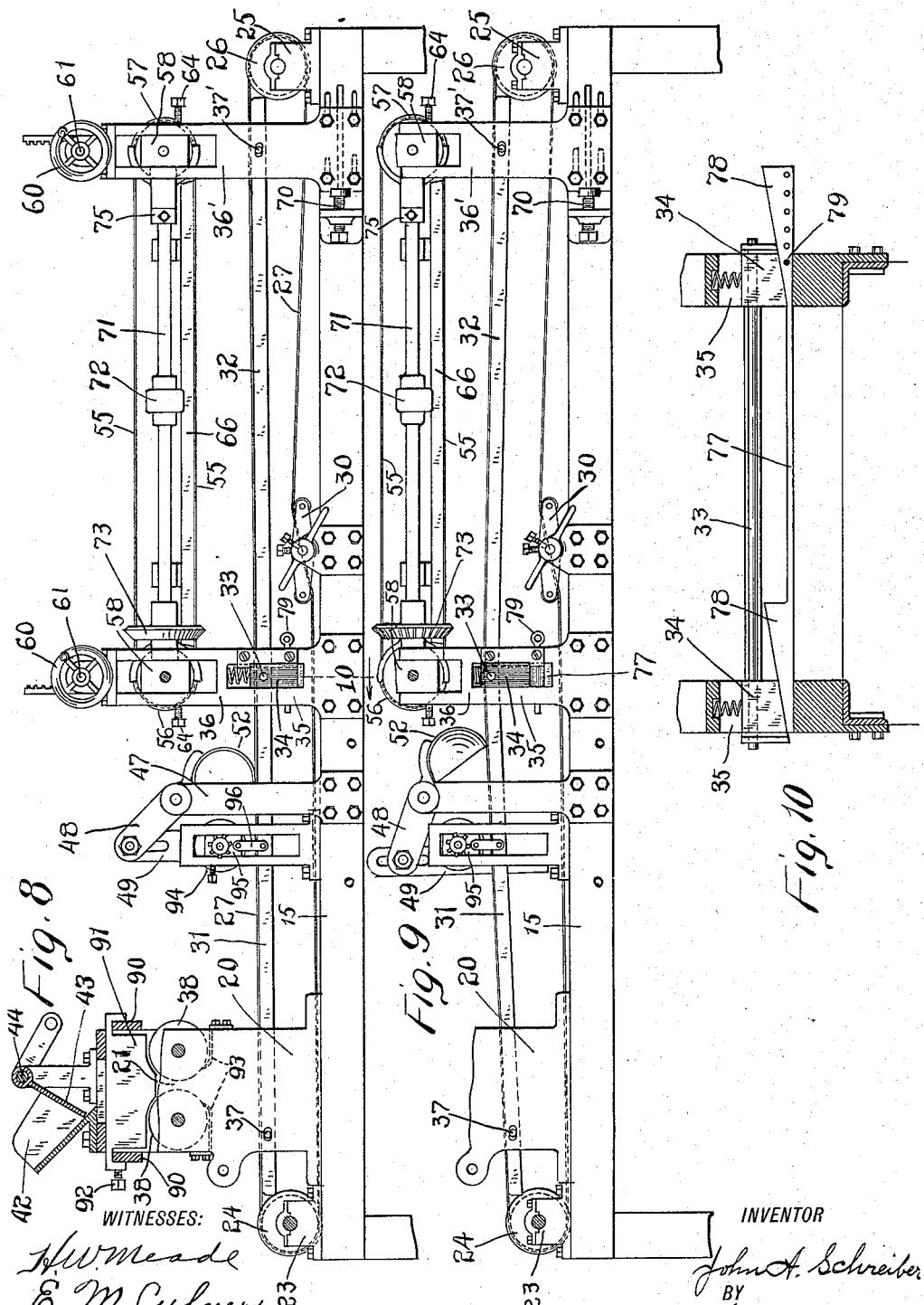

UNITED STATES PATENT OFFICE.

JOHN A. SCHREIBER, OF BRIDGEPORT, CONNECTICUT.

BREAD-MOLDING MACHINE.

1,156,185.  Specification of Letters Patent.  Patented Oct. 12, 1915.

Application filed April 7, 1914. Serial No. 830,144.

*To all whom it may concern:*

Be it known that I, JOHN A. SCHREIBER, a citizen of the United States, residing at Bridgeport, county of Fairfield, State of Connecticut, have invented an Improvement in Bread-Molding Machines, of which the following is a specification.

This invention relates to new and useful improvements in molding machines, and more particularly to that type of machines utilized for molding bread.

One of the objects of the invention is to provide a machine of this character adapted to receive measured or scaled masses of dough and to mold or shape said dough into loaves for baking.

A further object is to provide means whereby the dough may be molded to form round or oblong loaves of bread, as may be desired.

A further object is to provide means for preventing the feeding of the masses of dough too frequently.

A further object is to provide a molding apron, and means for selectively actuating the same to impart the desired shape to the mass being molded.

A further object is to provide means for automatically dredging flour over the dough carrier to prevent the masses of dough being molded from sticking to the carrier.

The invention will be hereinafter fully set forth and particularly pointed out in the claims.

Figure 1:
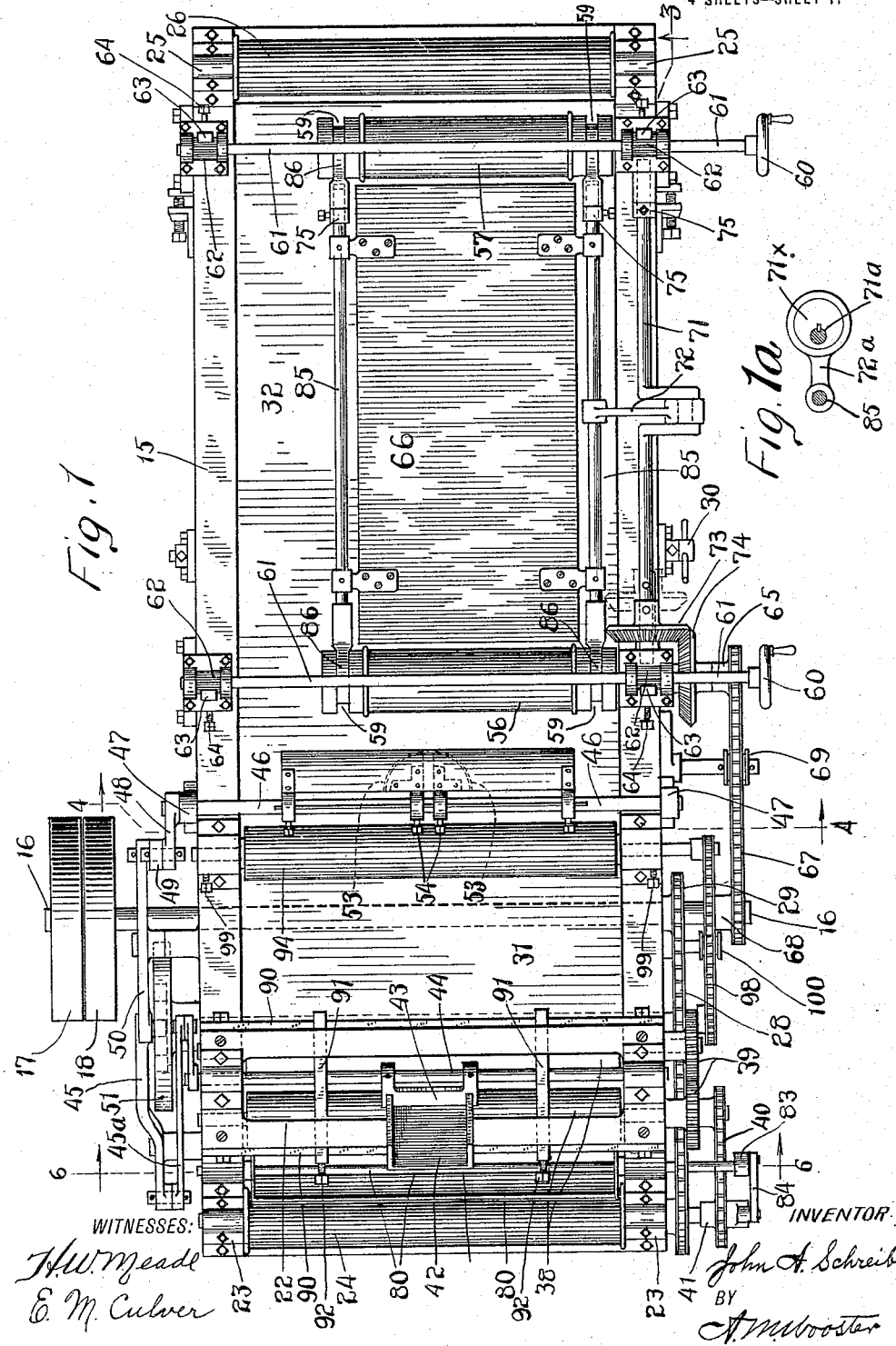
Figure 2:
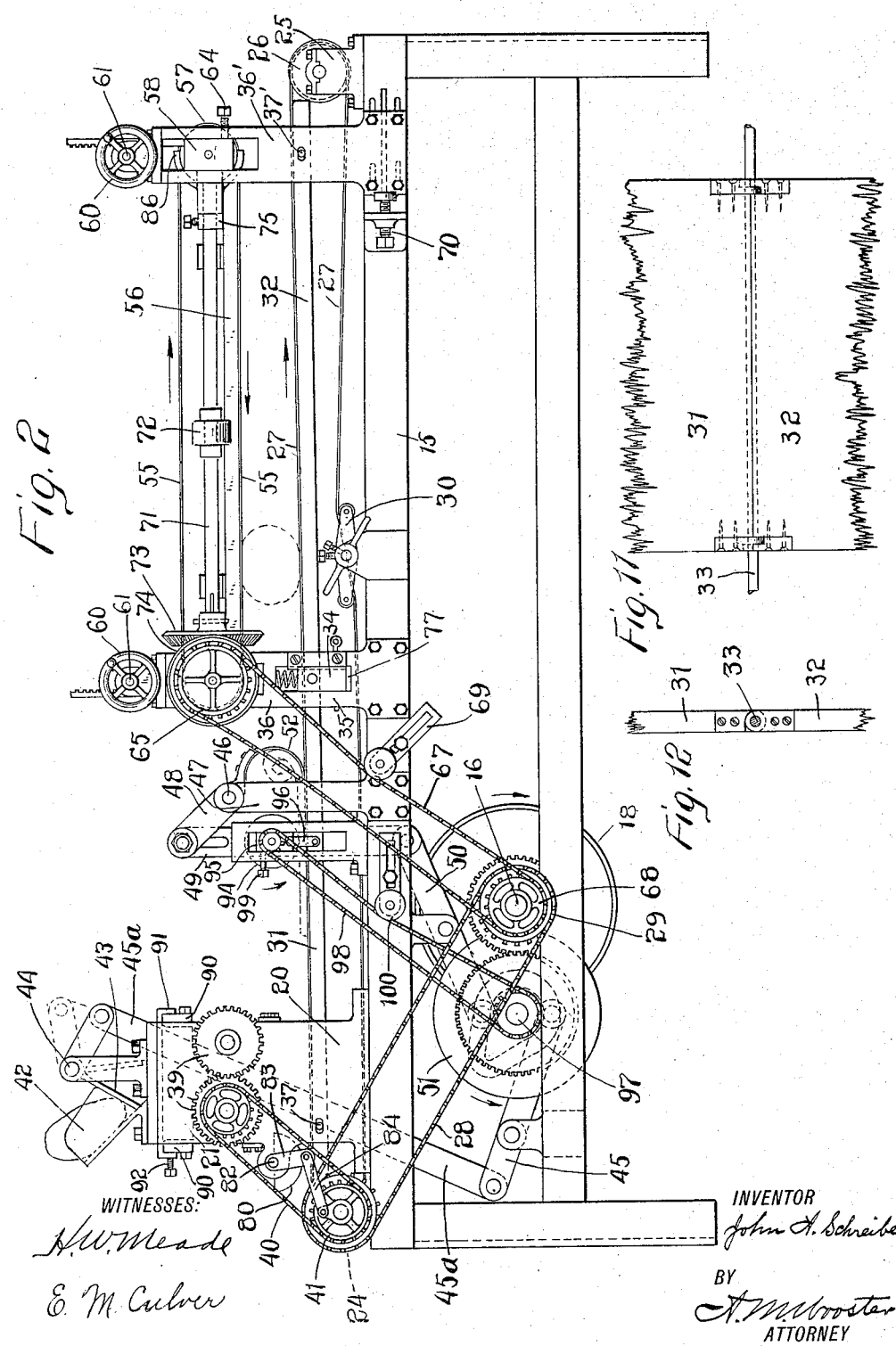
Figure 3:
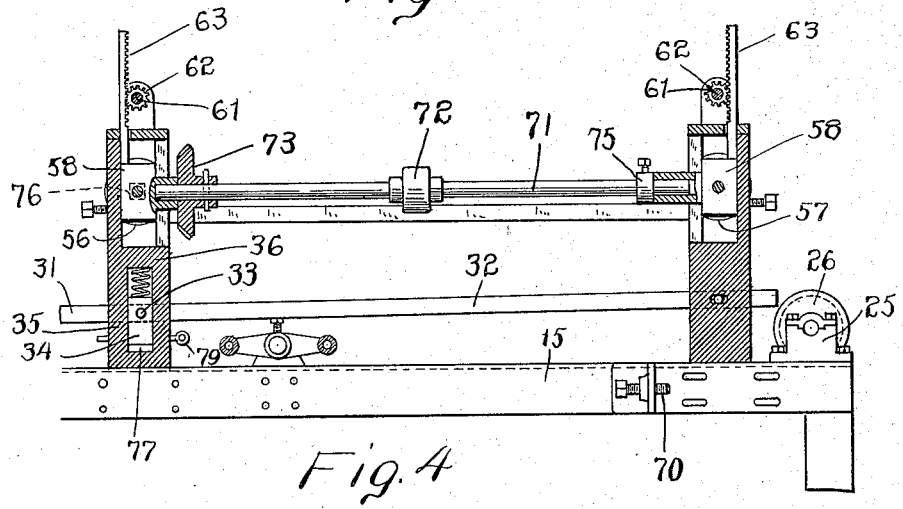
Figure 4:
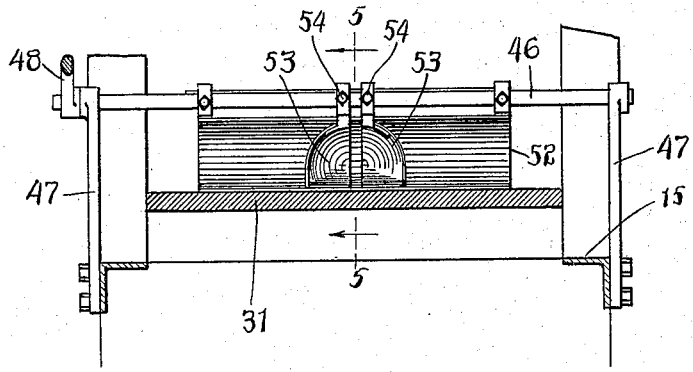
Figure 5:
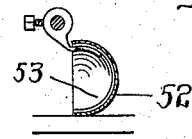
Figure 6:
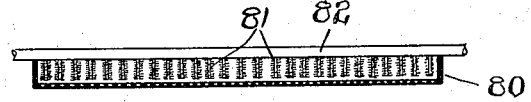
Figure 7:
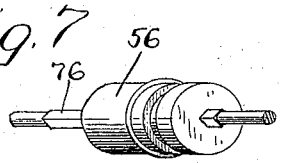

In the accompanying drawings:—Figure 1 is a plan view of my improved molding machine with the carrying belt and molding belt removed. Fig. 1ª is a detail view of a slight modification. Fig. 2 is a side elevation of the machine. Fig. 3 is a section through the molding roll housings, substantially on line 3, Fig. 1. Fig. 4 is a view illustrating means for rolling the dough, being substantially a detailed section on line 4—4 Fig. 1. Fig. 5 is a section on line 5—5 Fig. 4. Fig. 6 is a detail view illustrating the flour sprinkling means, being a detail section on line 6—6 Fig. 1. Fig. 7 is a perspective view illustrating a portion of the driving roll and shaft of the molding mechanism. Fig. 8 is a side elevation of the machine, parts being removed, illustrating the inclination of the carrying belt when the machine is used for forming cylindrical loaves. Fig. 9 is a similar view illustrating the preferred arrangement of the carrying belt and support when the machine is forming spherical loaves. Fig. 10 is a detail sectional view on line 10 Fig. 8 illustrating means for adjusting the carrying belt supports. Figs. 11 and 12 are detail plan and edge views of the hinged portion of the carrying belt support or backing.

Referring to the drawings, 15 designates a frame of any suitable construction in which is mounted the main driving shaft 16 provided with fast and loose driving pulleys 17, 18 respectively, receiving power from any suitable source not shown. Located at one end of said frame are suitable uprights 20 which support a housing 21 provided with an opening 22 in its top. Mounted in suitable bearings 23 adjacent the uprights 20 is a roll 24, and mounted in similar bearings 25 at the other end of the machine is a similar roll 26, a carrying belt 27 being passed around said rolls. The roll 24 is driven by means of a sprocket chain 28 receiving power from a drive sprocket wheel 29 on shaft 16. A suitable belt tightener 30 is provided to maintain the desired tension upon the belt 27. The upper stretch of the belt 27 lies upon a support formed of sections 31, 32 pivotally connected by means of a shaft 33. The ends of shaft 33 are carried by boxes 34 slidingly mounted in housings 35 carried by standards 36 secured to the main frame, said boxes and housings being provided with complemental grooves and splines to prevent relative lateral movement. The free end of the section 31 is provided with pins 37 extending through slots in the uprights 20, and the free end of section 32 is provided with similar pins 37' extending through slots in uprights 36' secured to the frame 15.

Mounted to rotate in suitable bearings carried by the housing 21 are rolls 38 provided with intermeshing gears 39, one of which is driven in suitable manner, such as a sprocket chain 40 passed around a sprocket 41 on the shaft of the roll 24. Leading to the opening 22 is a chute 42, the lower end of said chute being closed by a swinging plate 43 secured to a suitably supported rock shaft 44 which is periodically rocked by a lever 45 engaging a cam 51 and connected with a crank arm secured to the rock shaft by a link 45ª. Said cam is mounted on a shaft 97 suitably geared with the main shaft 16. A second rock shaft 46 is supported by suitable standards 47, the said shaft 46 being periodically rocked through the medium of a second crank arm 48 connected to said shaft, and connected by a link 49 with a lever 50 actuated by cam 51. Secured to the shaft 46 is a semi-cylindrical member 52, which I term a dough rolling member, and the function of which is to impart a preliminary shape to the dough mass before finally imparting the shape desired for the loaf. Also secured to said shaft 46 are two scoop shaped members 53, said members being adjustable relative to each other, which adjustment may be effected by loosening the set screws 54 and placing said members in the desired position. Upon each side of the standards 20 are placed bars 90 to support dough retaining plates 91 which may be spaced apart any desired distance and locked by set screws 92. The object of these plates is to confine the dough passing through the rolls 38 to predetermined widths and when spherical loaves are formed it causes the dough to be rolled to such width as will best be acted upon by the scoops 53. If desired scrapers 93 may be provided to keep rollers 38 clean. In front of the dough rolling member is a roller 94 mounted in boxes 95 housed in suitable standards, said boxes being connected by links 96 with the front section 31 of the support. By this means any adjustment of the support effects a corresponding adjustment of the roll, so that the roll is always spaced a predetermined distance from the support. Said roll may be driven from the cam shaft 97 by means of a chain 98. The boxes may be secured after adjustment by set screws 99 and a suitable chain tightener 100 is also provided.

The molding apron 55 comprises a belt passed around rollers 56, 57, mounted in suitable bearings 58 supported by the uprights 36 and 36'. The lower stretch of said molding apron is backed by a backing plate 66 which is supported by means of rods 85 having yoke portions 86 which engage grooved portions 59 of the rollers 56 and 57. The bearings 58, and rolls and parts carried thereby may be raised or lowered by means of hand wheels 60 secured to shafts 61 provided with pinions 62 engaging racks 63 connected with the bearing boxes. Said bearing boxes are locked in desired position by set screws 64. The shaft upon which roller 56 is mounted is driven in any suitable manner, preferably by means of a sprocket wheel 65 which receives its power from a chain 67 driven by a sprocket wheel 68 on the main drive shaft 16. A suitable chain tightener 69 may be employed to maintain the chain 67 taut. Likewise the tension on the molding apron 55 may be maintained by adjusting the uprights 36' through the medium of adjusting screws 70. Mounted in suitable bearings carried by the uprights 36 and 36' is a crank shaft 71 connected by means of a pitman 72 with one of the rods 85. Said crank shaft extends in a line parallel with the line of travel of the carrier 27 and the molding apron 55, and is driven by means of a bevel gear 73 meshing with a similar gear 74 on the shaft of the roll 56. Said gear 73 is slidably mounted so that it may be moved out of mesh with the gear 74. In order to permit of the tightening of the molding apron it is necessary to provide the rods 85 and the crank shaft 71 with slip connections, said connections being shown as comprising sockets to receive the respective rods and shaft and collars 75 provided with set screws to prevent lost motion after adjustment. In order to permit of the lateral movement of the molding apron under the action of the crank shaft 71, and at the same time to continue to drive said apron, it will be noted that the shaft upon which the roll 56 is mounted is provided with a squared portion as indicated at 76. In lieu of the crank shaft 71 and pitman 72, the construction illustrated in Fig. 1ª may be employed, the same comprising an eccentric 71ˣ secured to shaft 71ª and connected to rod 85 by an eccentric strap 72ª.

It will be noted that in Fig. 2 the carrying belt 27 and the support therefor are shown inclined, the end beneath the rolls 38 being lower than the delivery end of said carrier. Under some conditions it is desirable that the space between the molding belt and the carrying belt gradually increase as the dough is carried forward. To accomplish this result a cam slide 77 provided with wedges 78 is pushed beneath the boxes 34 elevating the latter as indicated in Fig. 9. The slide is held in any desired position by a pin 79, passed through any one of a series of holes formed in the slide 77, and engaging corresponding holes in one of the supports 36. When the support is raised in this manner it is necessary to readjust the connection between the crank arm 48 and link 49, this adjustment being accomplished by reason of the slotted connection between the respective parts.

In order to provide a supply of flour to prevent the dough from sticking to the carrier, I provide a flour container 80 having holes in its bottom, and mount an agitator 81 therein so as to cause the flour to be sprinkled onto the carrier. The agitator comprises brushes secured to a shaft 82 which is operated through the medium of a crank arm 83 connected by a link 84 with a crank on the shaft 24.

In operation when it is desired to form an oblong loaf, a mass of dough is placed within chute 42, and when plate 43 swings to open position the dough is passed through the opening 22 between the rollers 38 and is deposited upon the carrier 27 in the form of a sheet, the plates 91 having first been adjusted to the desired width. After dropping onto the carrier 27 the sheet of dough is carried forward until it passes under roll 94 and is engaged by the edge of the dough rolling member 52. The semi-cylindrical shape of the latter directs the fore edges of the sheet of dough upwardly and backwardly, causing the mass to roll upon itself into approximately cylindrical form, and as this operation is completed the mechanism is so timed that the member 52 is raised permitting the rolled mass to be carried forward beneath the molding apron 55, the operative face of which is traveling in the opposite direction to the travel of the operative face of the carrying belt but at a slower speed, so that as the carrying belt takes the dough forward, the mass is rolled tightly and elongated until it is delivered from beneath the molding apron. In order to form spherical loaves the boxes 34 are preferably elevated as disclosed in Fig. 9, and the other parts correspondingly adjusted. The bevel gear 73 is also thrown into mesh with the bevel gear 74. The dough is passed between the rollers 38 as before described, onto the carrier 27 and is fed forward until it is engaged by the scoop members 53 which have been previously adjusted to the desired position. These scoops in effect are not unlike curved hands, with fingers and thumbs close together and with the edges of the palms joined. The action of these scoops is to take the sheet of dough delivered to the carrier and to turn it back upon itself and simultaneously roughly form it into a lump or mass as nearly spherical as possible. The dough is then released as before, being carried under the molding apron. As the dough passes beneath said apron 55, the latter is given a lateral reciprocating motion by the shaft 71, which coöperates with the forward movement of the carrying belt to roll the mass to and fro laterally while moving forward and thus form the lump or mass of dough into a ball, in which form it is discharged from the machine. It will be understood that a mass of dough having the cylindrical form will produce an oblong loaf, and that a spherical mass of dough when placed in a pan will flatten out and bake into the common round shape. It should also be understood that the scoop members 53 are placed as far apart as possible when cylindrical shape is to be imparted. The cam 51 is so formed that plate 43 is first swung to the dotted line position Fig. 2, to allow a mass of dough to drop on rolls 38 and to pass thence to the rolling member 52. While the sheet of dough is being rolled up another mass may be placed in the chute. When the first sheet of dough is approximately half rolled up, the cam 51 again opens the chute to allow the dough therein to pass to the rolls. Before this second mass has entirely passed through, however, the first mass has been entirely rolled up and the cam 51 then swings the rolling member 52 upward to permit the first roll of dough to pass to the molding mechanism. The operation of cam 51 in this connection is obvious. In this manner too rapid feeding of the dough is prevented. As the machine operates the carrying belt 27 is automatically covered with flour dredged from the container 80.

Having thus explained the nature of my invention and described an operative manner of constructing and using the same, although without attempting to set forth all of the forms in which it may be made, or all of the forms of its use, what I claim is:—

1. A molding machine of the character described comprising a carrier, a dough rolling member supported above and transversely of the carrier, and provided with a concaved face of such a shape and size as to cause the fore edge of the mass of dough to move upwardly and backwardly by a continuous rolling motion until the mass is formed in a roll, means for periodically oscillating said dough rolling member to release the rolled mass of dough, and means for shaping the mass after it is released by said rolling means.

2. A molding machine of the character described comprising a carrier, a dough rolling member supported above and transversely of the carrier, and provided with a concaved face of such shape and size as to cause the fore edge of the mass of dough to move upwardly and backwardly by a continuous rolling motion until the mass is formed in a roll, and means for shaping the rolled mass.

3. A molding machine of the character described comprising a carrier, means for supplying a mass of dough to said carrier in sheet form, a dough rolling member supported above and transversely of the carrier and provided with a concaved face of such shape and size as to cause the fore edge of the mass of dough to move upwardly and backwardly by a continuous rolling motion until the mass is formed in a roll, and means for shaping the rolled mass.

4. A molding machine of the character described comprising a carrier, means for supplying a mass of dough to said carrier in sheet form, a dough rolling member supported above and transversely of the carrier and provided with a concaved face of such shape and size as to cause the fore edge of the mass of dough to move upwardly and backwardly by a continuous rolling motion until the mass is formed in a roll, means for periodically oscillating said dough rolling member to release the rolled mass of dough, and means for shaping the mass after it is released by said rolling means.

5. A molding machine of the character described comprising a carrier, a rock shaft arranged transversely of said carrier, a dough rolling member attached to said rock shaft and provided with a concaved face of such shape and size as to cause the edge of the mass of dough to move upwardly and backwardly by a continuous rolling motion until the mass is formed into a roll, means for periodically actuating said rock shaft to permit the intercepted dough to pass, and means for shaping the dough after it passes said rolling device.

6. A molding machine of the character described comprising a carrier, a rock shaft arranged transversely of said carrier, a dough rolling member having its upper edge attached to said rock shaft with said member suspended so that its lower edge will intercept masses of dough as they are fed forward by the carrier, said dough rolling member being provided with a concave face of such shape and size as to cause the fore edge of the mass of dough to move upwardly and backwardly by a continuous rolling motion until the mass is formed in a roll, and means for actuating said rock shaft to permit the intercepted dough to pass.

7. A molding machine of the character described comprising a carrier, a housing for directing masses of dough to said carrier and provided with an inlet opening, a closure for said opening, a dough rolling device arranged to intercept masses of dough as they are fed forward by the carrier, means for moving said closure and said dough rolling device in turn, and means for shaping the masses of dough after they pass said rolling device.

8. A molding machine of the character described comprising a carrier, a housing for directing masses of dough to said carrier and provided with an inlet opening, a closure for said opening, a dough rolling device arranged to intercept masses of dough as they are fed forward by said carrier, a rock shaft to which said dough rolling device is connected, a cam for actuating said rock shaft, means actuated by said cam for operating said closure in time with said dough rolling device, and means for shaping the masses of dough after they pass said rolling device.

9. A molding machine of the character described comprising a carrier, a housing for directing masses of dough to said carrier and provided with an inlet opening, means between said opening and said carrier to impart a sheet-like form to each mass of dough as it is delivered to the carrier, a closure for said opening, a dough rolling device arranged to intercept the sheets of dough as they are fed forward by the carrier, means for operating said closure and said rolling device in turn, and means for shaping the dough after it passes said rolling device.

10. A molding machine of the character described comprising a carrier, a dough rolling member supported above and transversely of the carrier, and provided with a concaved face of such shape and size as to cause the fore edge of the mass of dough to move upwardly and backwardly by a continuous rolling motion until the mass is formed in a roll, and a molding apron coöperating with the carrier to shape the mass after the rolling operation.

11. A molding machine of the character described comprising a carrier, means for rolling a mass of dough upon itself while being fed forward by said carrier, a backing for said carrier throughout its entire width, a molding apron coöperating with said carrier, and means for adjusting said backing to vary the angle of said carrier with respect to said apron.

12. A molding machine of the character described comprising a carrying belt, means for operating the same, rolls supported above and adjustable to and from the top surface of said carrying belt, a molding apron supported by said rolls, a backing for said apron also supported by and adjustable with said rolls, and means whereby the tension of said apron may be adjusted without affecting said backing.

13. A molding machine of the character described comprising a carrying belt, means for operating the same, rolls supported above and adjustable to and from the top surface of said carrying belt, a molding apron supported by said rolls, a backing for said apron also supported by and adjustable with said rolls, and supporting means for the backing attached to the sides thereof and sustained by said rolls.

14. A molding machine of the character described comprising a carrying belt, means for operating the same, rolls supported above and adjustable relative to said carrier, a molding apron supported by said rolls, spaced apart rods supported at their ends by said rolls and adjustable therewith, and a backing for said apron having its side edges attached to said rods.

15. A molding machine of the character described comprising a carrying belt, means for operating the same, rods supported above and adjustable relative to said carrier, a molding apron supported by said rolls, spaced apart rods having their ends provided with yoke-like portions embracing said rolls, whereby said rods are supported by and adjustable with the rolls, and a backing for said apron having its side edges attached to said rods.

16. A molding machine of the character described comprising a carrier, rolls supported above said carrier, a molding apron supported by said rolls, a backing also supported by said rolls, and means attached to said backing for imparting lateral movement to said apron and said rolls.

17. A molding machine of the character described comprising a carrier, rolls supported above said carrier, a molding apron supported by said rolls, a backing also supported by said rolls, means attached to said backing for imparting lateral movement to said apron and said rolls, and means for causing said apron to travel at a slower speed than said carrier.

18. A molding machine of the character described comprising a carrier, rolls supported above said carrier, a molding apron supported by said rolls, a backing for said apron also supported by said rolls, a crank shaft extending parallel with said backing, and connections between said crank shaft and said backing, whereby lateral movement is imparted to the rolls and the backing.

19. A molding machine of the character described comprising a carrier, transverse shafts supported above said carrier, rolls mounted to slide on said shafts, a molding apron supported by said rolls and extending parallel with said carrier, means for driving said apron and said carrier longitudinally in the same direction, and means for reciprocating said rolls on said shafts.

20. A molding machine of the character described comprising a carrier, transverse shafts supported above said carrier, rolls mounted to slide on said shafts, a molding apron supported by said rolls, and extending parallel with said carrier, means for driving said apron and said carrier longitudinally in the same direction, rods connecting said rolls, and means connected with one of said rods for reciprocating the rolls on their shafts.

21. A molding machine of the character described comprising a carrier, transverse shafts supported above said carrier, rolls mounted to slide on said shafts, a molding apron supported by said rolls and traveling in the same longitudinal direction as said carrier, a crank shaft, and means connected with said crank shaft for imparting reciprocable movements to said rolls on their supporting shafts.

22. A molding machine of the character described comprising a carrier, transverse shafts supported above said carrier, rolls mounted to slide on said shafts, a molding apron supported by said rolls and traveling in the same longitudinal direction as said carrier, rods connecting said rolls, a crank shaft parallel with said rods, and connections between said crank shaft and one of said rods.

23. A molding machine of the character described comprising a carrier, a molding apron mounted above the carrier and traveling in the same direction, a backing member for the carrier formed of hinged sections and of substantially the same width as the carrier, and means for adjusting the hinged portion of said carrier to change the angle of the back member throughout its entire width, with respect to said apron.

24. A molding machine of the character described comprising a carrier, a molding apron mounted above said carrier and traveling in the same direction, a backing member for said carrier formed of sections, a shaft pivotally connecting said sections, and means for adjusting the elevation of said shaft to vary the relative angle of said sections.

25. A molding machine of the character described comprising a carrier, a molding apron mounted above said carrier and traveling in the same direction, a backing member for said carrier formed in sections, a shaft pivotally connecting said sections, bearing boxes supporting said shaft, and a cam slide for varying the elevation of said boxes.

26. A molding machine of the character described comprising a carrier, a molding apron mounted above said carrier, and traveling in the same direction, a backing member for said carrier formed in sections, a shaft pivotally connecting said sections, bearing boxes supported by said shafts, and a cam slide having wedge portions extending beneath said boxes.

27. A molding machine of the character described comprising a carrier, a housing for directing masses of dough to said carrier, supporting bars secured to said housing, dough retaining plates adjustably mounted on said bars, and means for shaping masses of dough after leaving said housing.

28. A molding machine comprising a carrier, a backing member for said carrier, a dough rolling device arranged to intercept masses of dough as they are fed by said carrier, a roller for acting on the dough masses as the latter approach said rolling device, bearing boxes in which the ends of said roller are mounted, links connecting said bearing boxes with said backing member, and standards for retaining said boxes.

29. A molding machine comprising a carrier, a backing member for said carrier, a dough rolling device arranged to intercept masses of dough as they are fed by said carrier, a roller for acting on the dough masses as the latter approach said rolling device, bearing boxes in which the ends of said roller are mounted, links connecting said bearing boxes with said backing member, standards for retaining said boxes, and means for varying the angle of said backing member with respect to said carrier.

In testimony whereof I affix my signature in presence of two witnesses.

JOHN A. SCHREIBER.

Witnesses:
H. W. MEADE,
E. M. CULVER.